(12) United States Patent
Engelberth et al.

(10) Patent No.: US 6,393,187 B1
(45) Date of Patent: May 21, 2002

(54) OPTICAL FIBER ARRAYS WITH REDUCED RETURN LOSS AND METHODS FOR MAKING SAME

(75) Inventors: Jon W. Engelberth, Denville; John David Weld, Ledgewood, both of NJ (US)

(73) Assignees: Lucent Technologies, Murray Hill, NJ (US); Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/631,417

(22) Filed: Aug. 3, 2000

(51) Int. Cl.$^7$ .................................................. G02B 6/04
(52) U.S. Cl. ....................... 385/115; 385/116; 385/120; 385/901; 385/18
(58) Field of Search ................................. 385/115, 116, 385/120, 901, 18

(56) References Cited

U.S. PATENT DOCUMENTS 5,135,590 A * 8/1992 Basavanhally et al. ....... 156/64
5,185,846 A * 2/1993 Basavanhally et al. ..... 385/137

* cited by examiner

*Primary Examiner*—Brian Healy
*Assistant Examiner*—Sarah Woo
(74) *Attorney, Agent, or Firm*—Lowenstein Sandler PC (57) ABSTRACT

In accordance with the invention, an optical fiber array comprises a substrate providing a planar array of optical fibers. The optical fibers are parallel to an array axis, but the fiber ends present smooth, polished surfaces angled from the array axis to minimize return loss of light directed along the axis. Three embodiments are described. The first is a series of 1×n strip arrays each mounted at an angle to the array axis to form a saw tooth configuration faceplate. The holes in each strip are also angled to compensate for the angled mount. A second embodiment uses an angled planar faceplate having tapered holes. A third embodiment uses an angled faceplate planar with double-tapered holes to obtain the angled end surfaces. In each embodiment, the fiber ends are substantially coplanar with the faceplate surface but the ends are angled with respect to the array axis.

15 Claims, 8 Drawing Sheets

OPTICAL FIBER ARRAYS WITH REDUCED RETURN LOSS AND METHODS FOR MAKING SAME

FIELD OF THE INVENTION

This invention relates to optical fiber arrays and, in particular, to optical fiber arrays presenting polished fiber ends angled for reduced return loss. It also includes methods for making such arrays.

BACKGROUND OF THE INVENTION

One of the major advances in communications in recent years has been the increased use of optical fiber systems for carrying large quantities of information with low distortion and low cost over great distances. Optical systems are also very promising for computing and for switching because of the inherently high speeds at which they operate. For these reasons, considerable work has been expended to develop techniques for switching light beams directly, without converting the light to electrical energy. The use of such devices will depend to a great extent on the facility with which they can be made.

A free-space photonics switch which takes light from the end of a bundle of optical fibers, performs desired switching functions, and then projects the light into the end of a second bundle of optical fibers is described in the paper, "All-Optical Implementation of a 3-D Crossover Switching Network," by T. J. Cloonan et al. *IEEE Photonics Technology Letters*, Vol. 2, No. 6, Jun. 1990, pp. 438–440. The optical fiber ends of each bundle form a matrix array, which must be accurately registered with the other apparatus.

Conventional fiber arrays for free-space optical switching use n×n arrays of parallel fibers with the fiber ends presented on an array faceplate perpendicular to the fibers. The faceplate is typically made from silicon and includes an array of precision holes for insertion and alignment of the fibers, which are mounted in the faceplate with epoxy. The ends of the mounted fibers are polished against the faceplate surface. The fabrication of such arrays is described in greater detail in U.S. Pat. No. 5,135,590 issued to Basavanhally et al. on Aug. 4, 1992 and U.S. Pat. No. 5,185,846 issued to Basavanhally et al. on Feb. 9, 1993, both of which are incorporated herein by reference.

A difficulty with these conventional arrays is return loss. Light from a fiber incident on the flat fiber end reflects back into the fiber toward the laser source with deleterious consequences. An antireflection coating may be placed on the flat ends to reduce the return loss, but such coatings have only reduced return loss, not eliminated it. Precision mounted fiber arrays with further reduced return loss would be highly desirable.

SUMMARY OF THE INVENTION

In accordance with the invention, an optical fiber array comprises a substrate providing a planar array of optical fibers. The optical fibers are parallel to the array axis, but the fiber ends present smooth, polished surfaces angled from the array axis to minimize return loss of light directed along the axis. Three embodiments are described. The first is a series of 1×n strip arrays each mounted at an angle to the array axis to form a saw tooth configuration faceplate. The holes in each strip are also angled to compensate for the angled mount. A second embodiment uses an angled planar faceplate having tapered holes. A third embodiment uses an angled faceplate planar with double-tapered holes to obtain the angled end surfaces. In each embodiment, the fiber ends are substantially coplanar with the faceplate surface but the ends are angled with respect to the array axis.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

First Embodiment

Figure 1A:
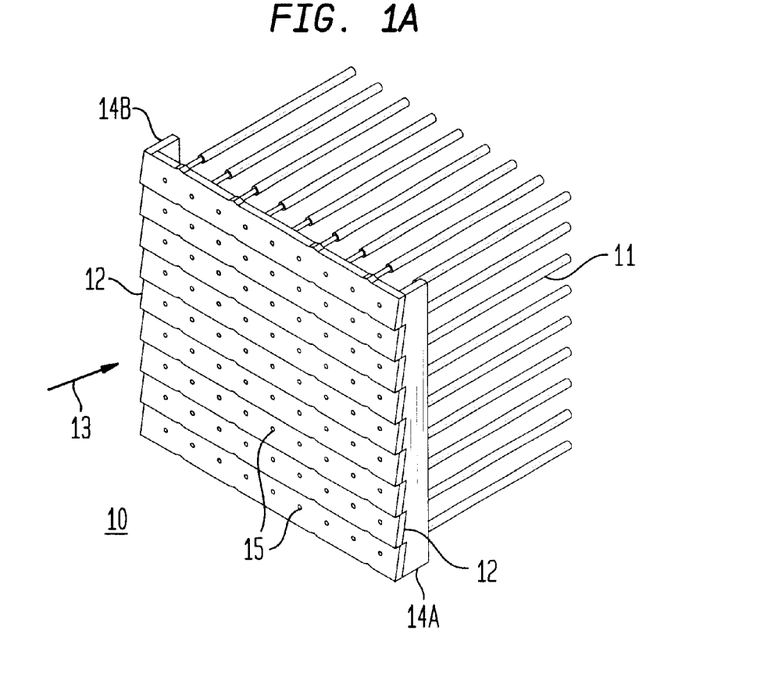
FIGS. 1A and 1B are front side and back side perspective views of a first embodiment of an optical fiber array having reduced return loss.
Figure 1B:
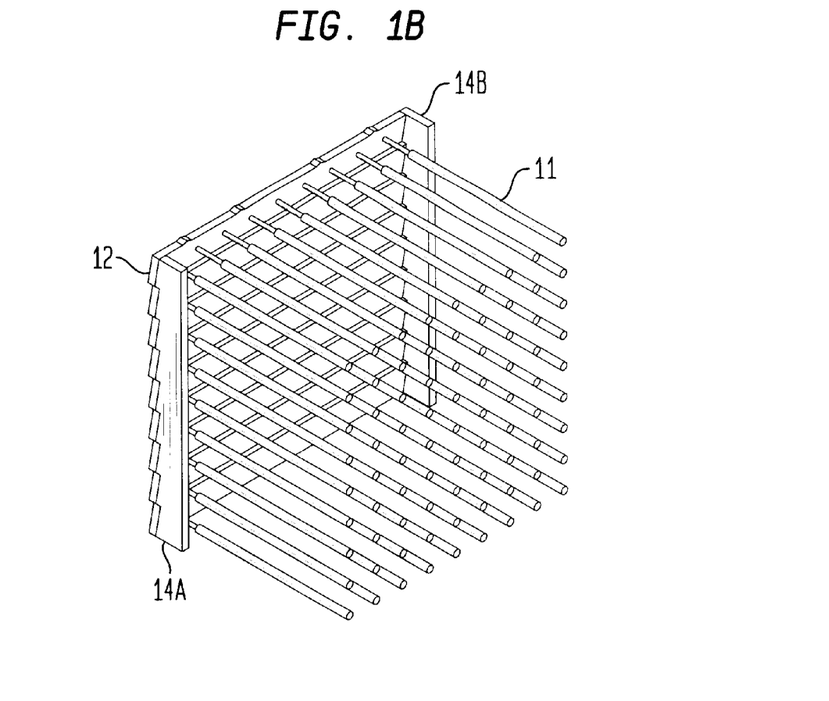

Referring to the drawings, FIGS. 1A and 1B are front side and back side perspective views of an optical fiber array 10 having reduced return loss. The n×n array 10 of optical fibers 11 comprises a plurality of 1×n strip arrays 12 mounted at an angle with respect to an array axis 13. Conveniently, the strip arrays are mounted on side rails 14A and 14B with saw tooth edges sloped to receive and maintain the strips 12 at the mounting angle.

Figure 2:
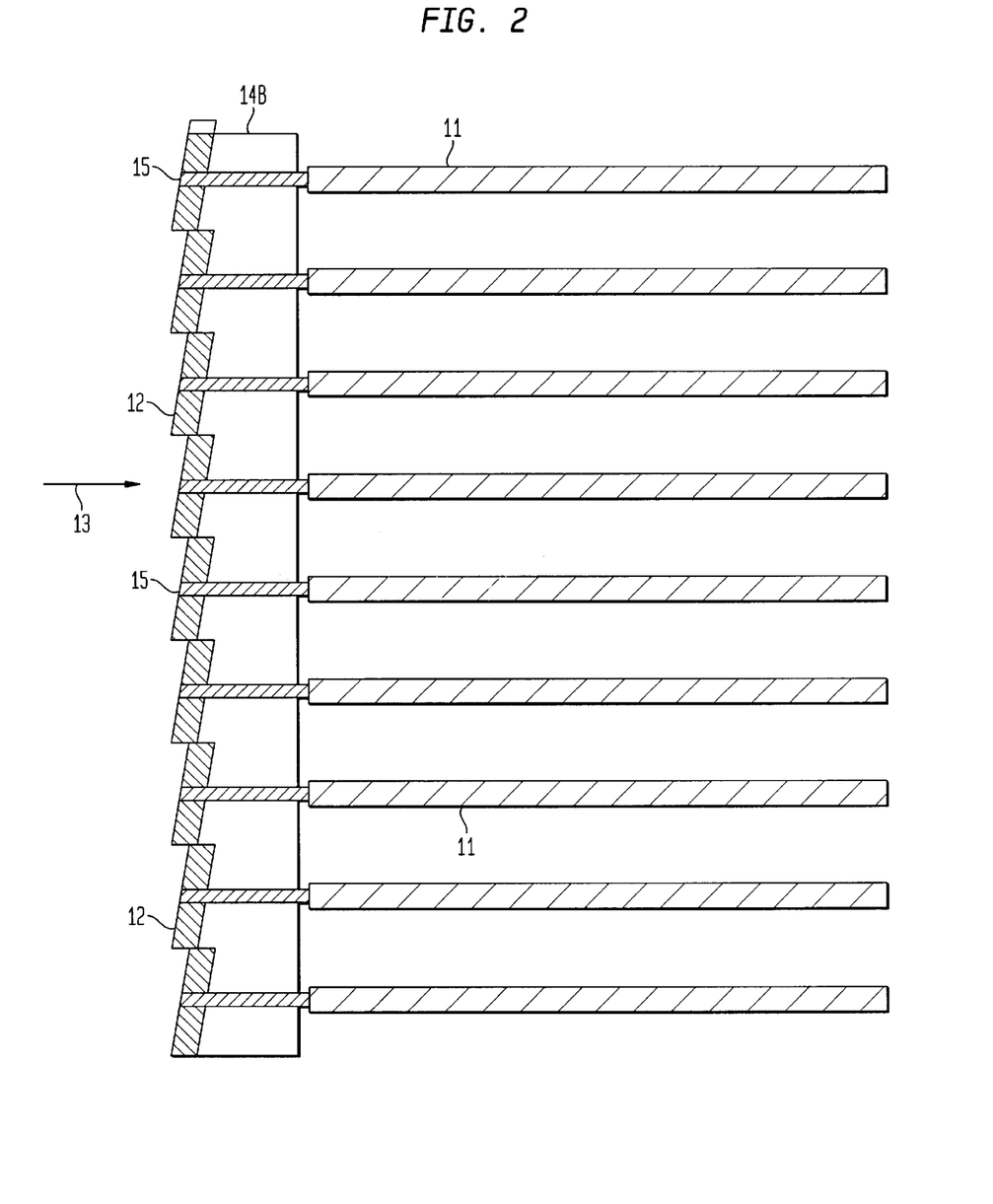
FIG. 2 is a schematic cross section of the FIG. 1 array.

As better shown in FIG. 2, each hole 15 is angled into the strip, and each strip is mounted at a compensating angle. The stacked series of plates 12 thus forms a saw tooth faceplate. The angling of the holes compensates the mounting angle of the strip arrays so that the axes of the fibers remain substantially parallel to the array axis 13.

Figure 3A:
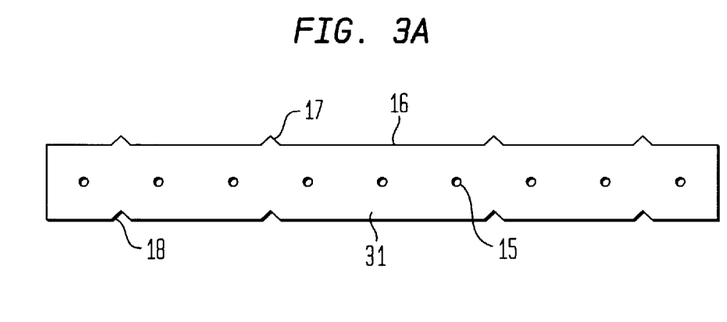
FIGS. 3A and 3B are front and end views of a preferred strip array bar useful in making the optical fiber array of FIG. 1.
Figure 3B:
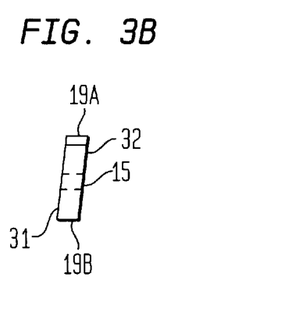

FIGS. 3A and 3B illustrate the features of a preferred strip bar 16 for a strip array 12. Conveniently the bar 16 is an elongated rectangular body of metal having a pair of parallel major surfaces 31, 32. FIG. 3A shows the front of a bar including the fiber holes 15 between the major surfaces and side edges 33 including projecting regions 17 along with mating receiving indentations 18 to assist in aligning successive bars in the array 10. FIG. 3B shows an end view. In this example, the top 19A, bottom 19B and holes are angled approximately 8° from a normal between the major surfaces to facilitate and compensate the angled mount of the array.

The preferred method of making the bars 16 is using a micromachining process known as LIGA, which is commercially available from Cronos Integrated Microsystems, Inc., Research Triangle Park, North Carolina. In essence, LIGA is a micromachining process utilizing a sequence of operations including X-ray lithography, electrodeposition of metal, and release of the deposited metal to produce small metal parts with micron scale features and sub micron tolerances.

Figure 4A:
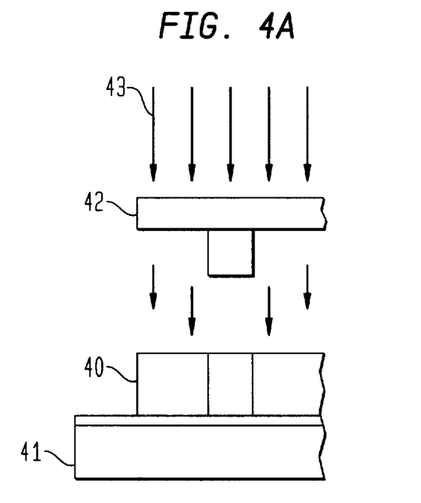
FIGS. 4A, 4B, 4C and 4D illustrate a preferred method of making the array bar of FIG. 3.

The steps in LIGA are illustrated in FIGS. 4A–4D. As shown in FIG. 4A, a layer of photo resist 40 ranging in thickness from 50 to 1000 μm is deposited onto a silicon substrate 41. A special, thick photolithography mask 42 patterned with a part profile is placed over the photo resist. X-ray irradiation 43 is used to expose the resist through the mask.

Figure 4B:
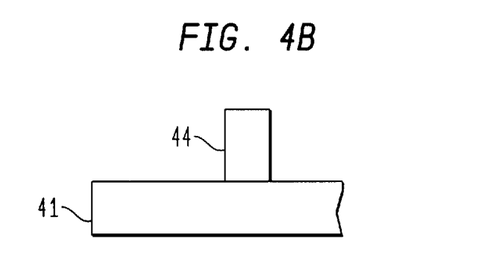

As shown in FIG. 4B the exposed portion of the photo resist is etched away leaving a resist structure 44 on the substrate in the configuration of the final part. Due to the high energy and short wavelength of the exposing X-ray irradiation, the sides of the exposed resist will be smooth and straight, parallel to the direction of the X-ray irradiation, which is typically perpendicular to the substrate but can be inclined. The short X-ray wavelength allows for part features limited only by the features of the mask.

Figure 4C:
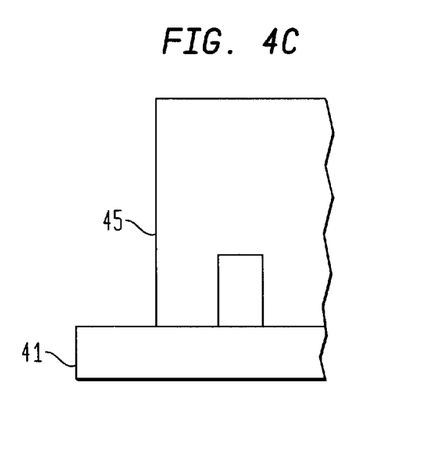

In FIG. 4C electrodeposition is used next to deposit a metal layer 45, typically nickel, onto the resist/silicon substrate 41, 44 filling the cavities where the photo resist was etched away. The electrodeposited metal can be deposited up to the thickness of the resist to produce a metal layer with open cavities in the shape of the mask, or it can be deposited much thicker than the resist to produce closed cavities useful as a mold cavity for micro molding plastic parts in the shape of the mask.

Figure 4D:
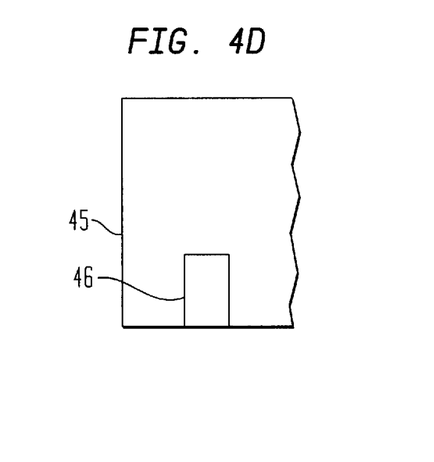

After electrodeposition is complete, the metal 45 is finished (FIG. 4D). The metal is typically planarized (machined flat). The metal layer is detached from the silicon substrate, and the resist is removed from the metal leaving cavity 46. A thin intermediate release layer may be applied to the silicon substrate prior to applying the resist to facilitate the removal of the metal from the silicon.

The invention may now be better understood by consideration of the following specific example.

EXAMPLE

First Embodiment

To form the device of FIGS. 1A and 1B, the linear arrays and the two side rails are constructed using the LIGA process. Each linear array is formed by first depositing a 0.500 mm thick photo resist layer onto a silicon substrate. A photolithography mask is patterned with the 1×9 mm outline of the linear arrays and nine elliptical holes linearly spaced at 1 mm along the length of the array. The size and shape of the elliptical holes are determined as the projection of a 0.125 mm diameter circle at an 8° angle. The mask is mounted over the resist, and X-ray irradiation is used to expose the resist through the mask at the same 8° angle as the projected circles used to form the elliptical array pattern on the mask. The elliptical holes on the mask and the 8° X-ray irradiation angle produces an array of circular profiles of 0.125 mm diameter when viewed at the 8° angle. The exposed portion of the photo resist is etched away leaving nine elliptical resist structures on the substrate with 8° angled sidewalls. The two 9 mm sides of each linear array will also have 8° sidewalls. To provide precision alignment between adjacent linear arrays in the fiber array, notch features are used on the sides of the linear arrays.

Electrodeposition is used to deposit a nickel layer onto the resist/silicon substrate the thickness of the resist layer at 0.500 mm. The nickel is planarized by machining smooth to the thickness of the resist. The resist is dissolved and the nickel structure is released from the silicon substrate by etching a thin intermediate release layer between the nickel and silicon. The separated nickel becomes a linear array. Multiple linear arrays can be formed in a single LIGA process step. The saw tooth side rails are formed by the same LIGA process, however, to produce straight sidewalls in the finished parts, standard perpendicular X-ray irradiation should be used.

Nine fibers are inserted and secured with an epoxy into each linear array. The ends of the fibers are polished against the face of the linear array to provide the 8° angles for reduced return loss in the fiber array. However, due to the combination of glass and metal being polished simultaneously, special polishing techniques may be necessary for sufficient polishing of the fiber ends. If the nine fibers are ribbonized on 1 mm spacing, possibly using Optiflex, to preserve axial rotation of the fibers, they could be pre-polished at the appropriate angle, even AR (anti-reflection) coated, then inserted simultaneously into the linear array and secured.

The nine linear arrays are assembled onto two saw tooth side rails, aligning the precision notches between adjacent linear arrays, and secured with a metallized epoxy to complete the fiber array. This saw tooth fiber array design using separate linear arrays provides the advantage that the optical lens array is a single component using standard spherical lens and aligned parallel to the surface of the fiber array.

Second Embodiment

Figure 5A:
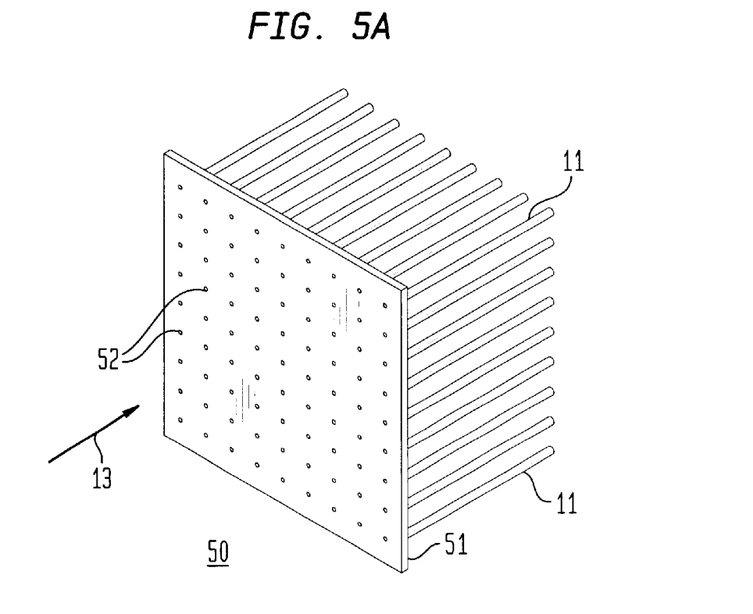
FIGS. 5A and 5B are front side and back side perspective views of a second optical fiber array having reduced return loss.
Figure 5B:
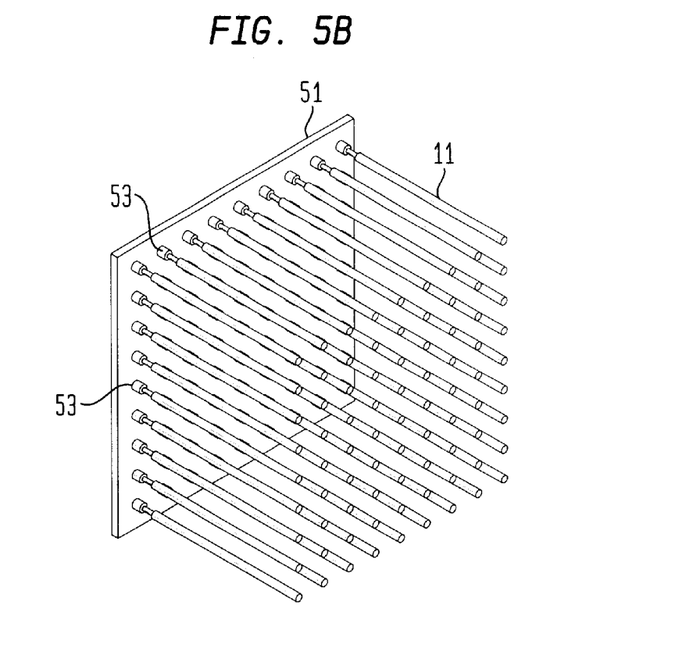

FIGS. 5A and 5B show perspective views of a second optical fiber array 50 with reduced return loss. Here a planar faceplate 51 is disposed on a mount (not shown) at an 8° angle from the array axis. As better shown in the cross section of FIG. 6, the fibers 11 extend through 8° angled holes 52 in fiber mounts 53 on the back of the faceplate and through tapered holes 54 in the faceplate. The angled holes 52 compensate the angle of the faceplate mount so that the fiber lengths are substantially parallel to the array axis.

Figure 6:
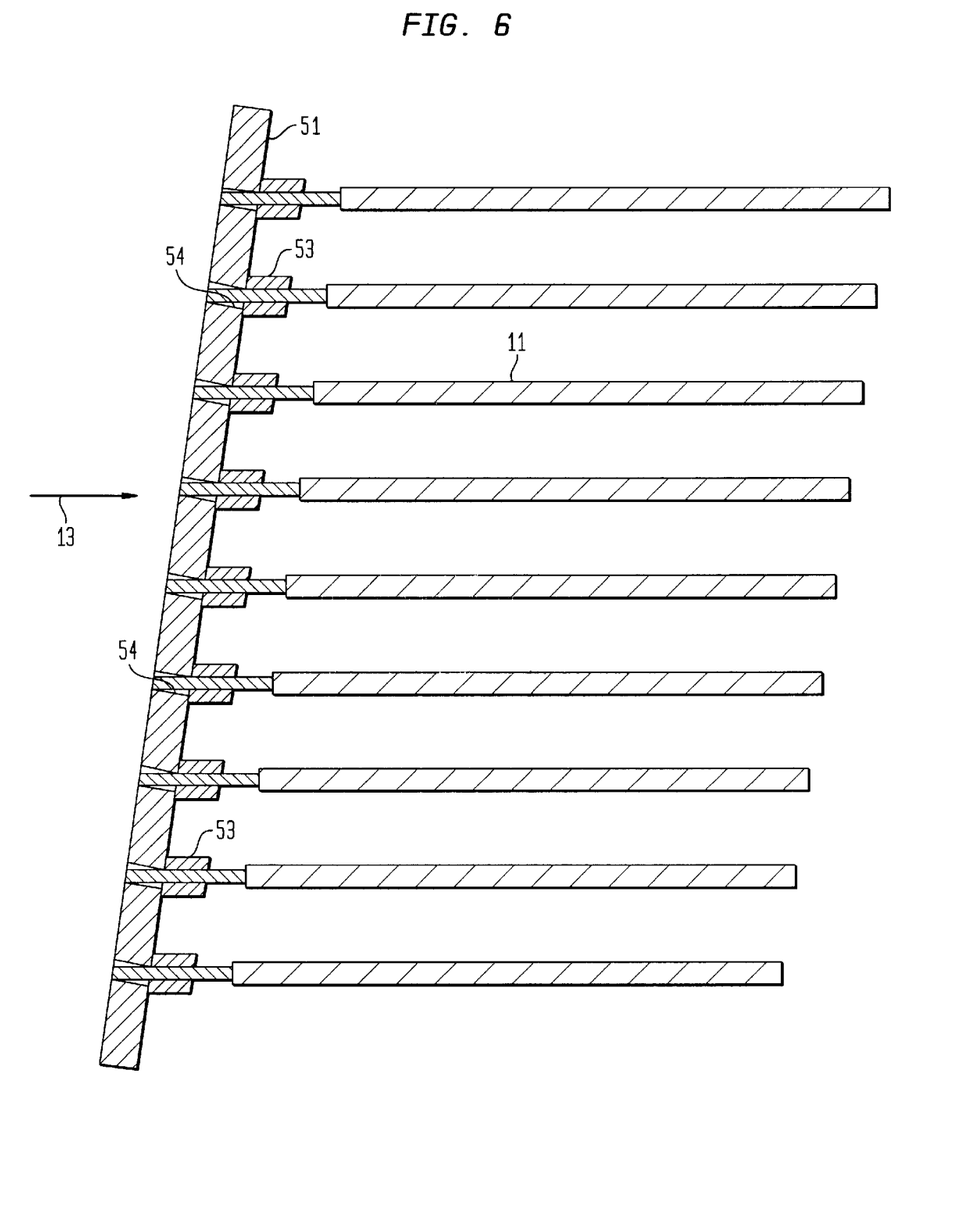
FIG. 6 is a schematic cross section of the FIG. 5 array.

The fiber ends can be polished flush to the faceplate. The fiber ends will then present an 8° angle to light propagating along the array axis when the faceplate is angled. A silicon faceplate provides a highly compatible surface for polishing the fiber ends, and the fiber mounts 53 are preferably nickel.

The preferred method for making the tapered holes 54 in the faceplate is a plasma etching process referred to as deep reactive ion etching (DRIE). In essence, DRIE is plasma etching using a relatively low pressure and a high electric field to remove material from a substrate by chemical reaction with active radicals. DRIE utilizes a molecular gas discharge comprising one or more halogens, typically chlorinated species. It is characterized by 1) the use of asymmetric electrodes where the ratio of a cathode area to grounded area is much less than one, 2) the substrates placed on a powered electrode and 3) relatively low operating pressures typically in the range 0.1 to 0.001 torr These combine to provide relatively high-energy ions at the substrate surface during etching. Under correct conditions, DRIE is capable of etching 2–7 μm/min. and to depths of more than 500 μm. By control of the etch parameters, the sidewalls of etched features can have a relatively controlled positive draft (increase of width with depth) from 2–8°.

EXAMPLE

Second Embodiment

An exemplary process for fabricating the array of FIG. 5 is to first utilize the LIGA process to form the angled fiber mounts onto the back of the silicon faceplate (substrate). A 0.500 mm thick photo resist layer is deposited onto the back of the silicon faceplate. A photolithography mask patterned with a 9×9 array of elliptical annuli spaced at 1 mm is placed over the resist layer. The size and shape of each elliptical annulus is determined by projecting a circular annulus with a 0.125 mm diameter center circle onto the mask at an 8° angle. The mask is mounted over the resist and X-ray irradiation is used to expose the resist through the mask at the same 8° angle and direction as the projected annulus used to form the elliptical annulus pattern on the mask. The exposed portion of the photo resist is etched away leaving elliptical resist structures on the faceplate with 8° sidewalls.

An electrodeposition nickel layer is deposited onto the resist/silicon faceplate the thickness of the resist layer, i.e., 0.500 mm. The resist is stripped from the silicon faceplate leaving only the nickel layer resulting in a 1 mm spaced array of nickel circular annuli at an 8° angle.

DRIE is used on the front of the silicon faceplate to form a 1 mm spaced array of holes through the silicon faceplate at the locations of the LIGA nickel fiber mounts to complete the holes for inserting, mounting and polishing the fibers. The tapered holes through the silicon faceplate formed by DRIE process are sized so that the small taper diameter is 0.125–0.127 mm and located to be coaxial with the 0.125 mm hole in the nickel fiber mounts. FIG. 6 shows a cross-section of a complete hole indicating these size and alignment constraints between the tapered hole in the silicon faceplate and the nickel fiber mount.

The fibers are assembled into the array by insertion into the nickel fiber mounts and through the tapered holes of the silicon faceplate. An epoxy can be used in the tapered section of the hole through the silicon faceplate to secure the fibers to the faceplate. The entire faceplate/fiber assembly is polished using standard fiber polishing techniques resulting in an 8° angle polish on the ends of the fibers.

The advantages of this silicon/metal based fiber array are manifold:

1) The fiber ends are easier polished against a silicon faceplate since silicon and silica have similar grinding/polishing characteristics, making fiber array fabrication easier, 2) The coefficient of thermal expansion of silicon is low (<0.5 ppm/° C.), resulting in a faceplate more thermally compatible with other optical components of an optical switching fabric, such as a lens array and MEMS mirror array, 3) The LIGA structures cover a relatively small area of the silicon faceplate, limiting warpage caused by the coefficient of thermal expansion mismatch between a silicon/metal composite structure.

4) The dimensional tolerances of the entire fiber array are improved because of the single monolithic silicon structure, with all precision fiber-locating features determined by the LIGA process.

Note that for the arrays of FIG. 1 and FIG. 5 insertion of the fibers into the arrays could be simplified by drilling a lead-in taper into the LIGA metal. For all embodiments herein, creating a taper on the ends of the fibers, which would be removed during polishing, by either heating and drawing the fibers ends, or etching the fibers ends would ease fiber insertion.

Third Embodiment

Figure 7A:
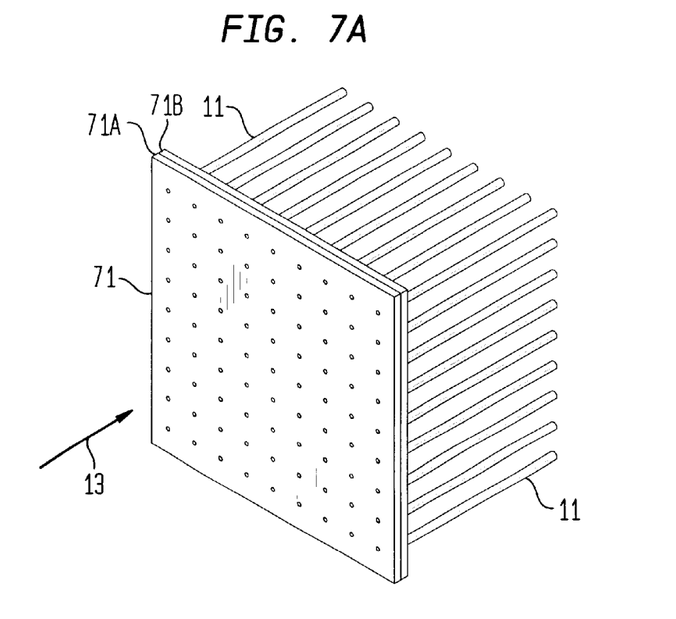
FIGS. 7A and 7B are front side and back side perspective views of a third optical fiber array having reduced return loss.
Figure 7B:
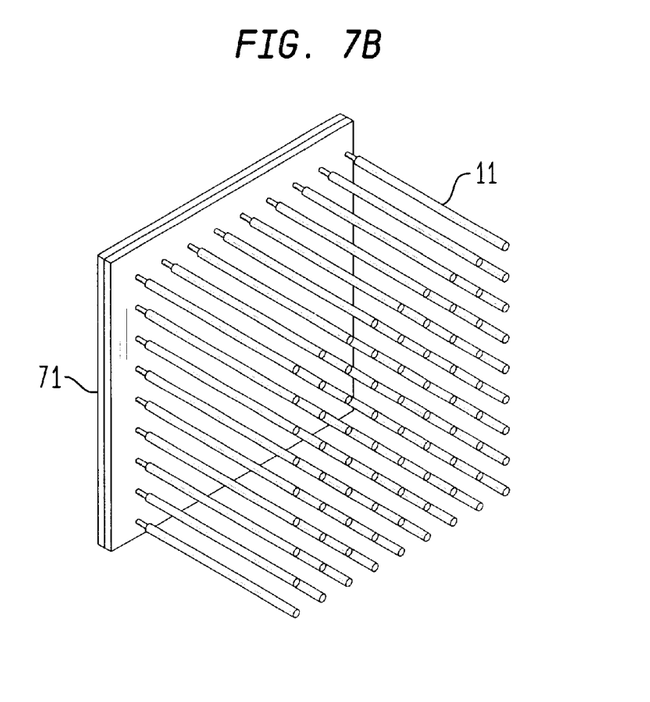

FIGS. 7A and 7B illustrate a third embodiment of an optical fiber array 70 wherein a faceplate 71 with double tapered holes 72 in a planar substrate 71 obtain the desired angled surface on the fibers protruding from the surface. As best shown in the cross section of FIG. 8, the double-tapered holes 72 can be formed on two faceplates halves 71A and 71B configured back-to-back with full depth tapered holes. Alternatively, holes 72 can be formed in a single faceplate with half depth tapered holes on both sides.

If t is the thickness of the finished faceplate, DRIE is used to form an array of holes with ≈1 μm clearance at the mask surface(s), and a sidewall taper of >8° at a depth of t/2. A second, identical array of holes, which is offset from the first hole array in a direction along an edge of the faceplate a distance of t tan 8° is also formed by DRIE to depth of t/2 and intersects with the first array of holes.

Figure 8:
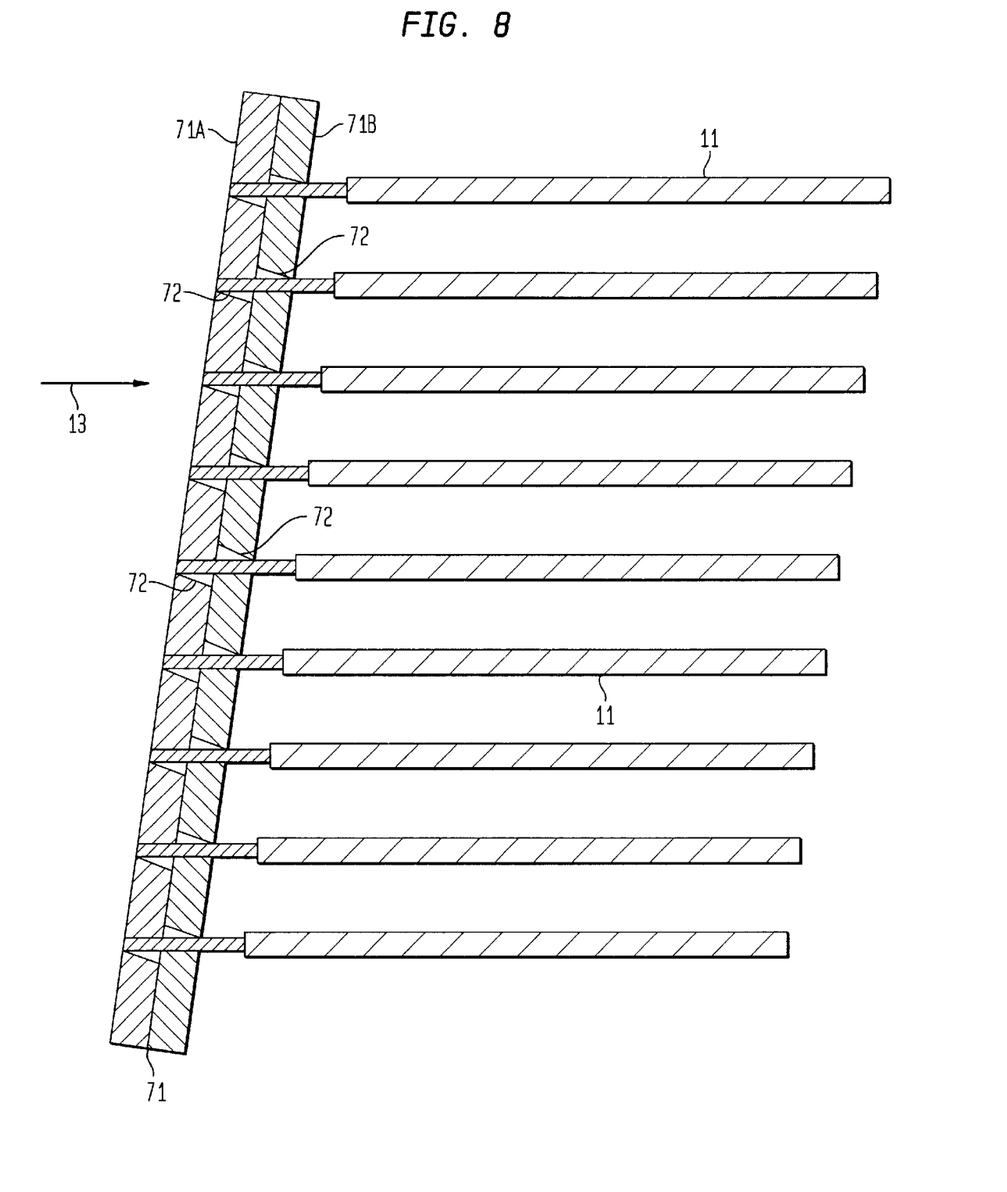
FIG. 8 is a schematic cross section of the FIG. 7 array.

FIG. 8 shows a cross-section of a double-tapered hole 72 through a silicon faceplate made with this technique. This double-tapered hole configuration through silicon can be achieved with DRIE using offset patterns on each side of a single silicon faceplate with half-depth holes as described above, or, if a thicker faceplate is required, using two silicon faceplates bonded together back-to-back with a 2t tan 8° offset and full-depth holes.

Fibers are inserted in the faceplate and secured with an epoxy, which should completely fill the voids in the tapered holes around the fibers. Immersing the faceplate and fiber assembly into a liquid epoxy under vacuum, then pressuring the epoxy to drive it into the evacuated voids could achieve this filling.

The ends of the fibers are polished flat along the surface of the faceplate. The final configuration constrains the fiber closely at both surfaces of the faceplate. If, for example, there were >1 μm difference between the diameters of the holes and fibers at each surface, and the faceplates were assembled by bonding two 400 μm wafers together, the maximum lateral and angular motion would be 1 μm and ≈0.3°, respectively.

It can now be seen that the methods of making the above-described fiber arrays comprise essentially the steps of providing a body having a planar surface for presenting the ends of the fibers; and providing openings through the body for receiving the fibers, the openings directing the fibers at an angle (preferably in the range 5.50°–8.50°) with respect to the planar surface. The fibers are mounted in the openings; the fiber ends are formed (polished) coplanar with the planar surface; and the body is mounted with the planar surface angled to compensate the angle of the fiber through the body so that the fibers form a straight parallel array. The body can present a linear array, as in the first embodiment, or a two dimensional array, as in the second and third embodiments.

APPLICATIONS

Figure 9:
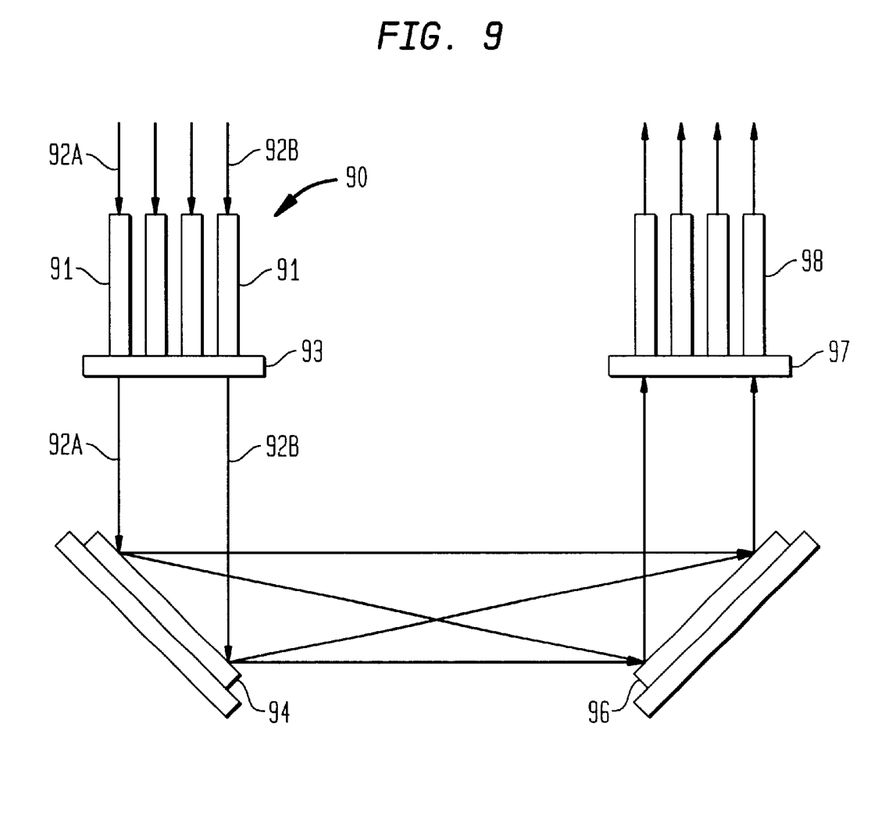
FIG. 9 illustrates a cross connect improved by the use of the optical fiber arrays of the invention.

It is contemplated that the optical fiber arrays disclosed herein will be particularly useful in improving optical cross connect devices using MEMS mirror arrays. FIG. 9 illustrates a typical such cross connect comprising an input array 90 of optical fibers 91 for providing a plurality of optical signals 92A, 92B. An input array 93 of lenses (individual lenses not shown) is positioned for receiving the optical signals from array 90 and for directing the signals to an input MEMS mirror array 94. The input array 94 receives the optical signals directed by the lens array 93 and reflects the signals to an output MEMS mirror array 96 from which the signals are reflected to an output array 97 of lenses directing the signals into an output fiber array 98. Various forms of this cross connect are described in detail in U.S. patent application Ser. No. 09/512,174 filed by Aksyuk et al. on Feb. 24, 2000, which is incorporated herein by reference.

The mirrors of the MEMS arrays are individually electrically controllable so that an optical signal from any input fiber can be reflected to any output fiber. Such MEMS mirror arrays are described in detail in U.S. patent application Ser. No. 09/415,178 filed Oct. 8, 1999 and U.S. patent application Ser. No. 09/410,586 filed Oct. 1, 1999, both of which are incorporated herein by reference.

The cross connect device can be improved by the use of the optical fiber array described herein (e.g. the array of FIG. 1) for the input fiber array 90. An input array with polished, angled ends would protect the optical sources from undesirable return and make the cross connect more efficient. Similarly, the output array 98 with angled ends would reduce return loss and enhance efficiency.

It is to be understood that the above-described embodiments are illustrative of only a few of the many possible specific embodiments, which can represent applications of the principles of the invention. Numerous and varied other arrangements can be readily devised by those skilled in the art without departing from the spirit and scope of the invention.

What is claimed is:

1. An optical fiber array for presenting a plurality of polished fiber ends to light, the array comprising a plurality of optical fibers parallel to an array axis, each fiber having an end, and a faceplate presenting the ends in a planar array, each end polished flat on the faceplate and each polished end angled with respect to the array axis by angle in the range 5.5–8.5 degrees.

2. The fiber array of claim 1 wherein the faceplate comprises an aligned series of linear fiber arrays, each linear fiber array comprising an elongated fiber array bar mounted at an angle with respect to the array axis and including a plurality of holes for receiving optical fibers, each hole angled to compensate for the angled mounting of the bar.

3. The fiber array of claim 1 wherein the faceplate comprises a planar faceplate mounted at an angle with respect to the array axis, the faceplate including an array of holes for receiving optical fibers, the holes angled to compensate for the angled mounting of the faceplate.

4. The fiber array of claim 3 wherein the faceplate comprises an array of tapered holes for receiving optical fibers and a corresponding array of fiber mounts for directing fibers into the tapered holes aligned substantially parallel with the array axis.

5. The fiber array of claim 3 wherein the faceplate comprises with an array of double tapered holes for receiving optical fibers, the double tapered holes directing respective optical fibers substantially parallel with the array axis.

6. A method of making an array of parallel optical fibers having reduced return loss comprising the steps of:

providing a body having a planar surface for presenting the ends of a plurality of optical fibers in an array;

providing openings through the body for receiving the fibers, the openings directing the fibers at an angle with respect to the planar surface;

mounting the fibers in the openings;

forming fiber ends coplanar with the planar surface; and mounting the body with the planar surface angled to compensate the angle of the fiber through the body so that the fibers form a straight parallel array.

7. The method of claim 6 wherein a plurality of bodies are provided, each body having a planar surface for presenting a linear array of fibers;

and the plurality of bodies are mounted in a stack with their respective planar surfaces parallel to form a two dimensional array of fibers.

8. The method of claim 7 wherein the plurality of bodies are mounted on sawtooth side rails.

9. The method of claim 6 wherein the openings through the body are tapered.

10. The method of claim 9 wherein the body is further provided with fiber mounts having openings and the openings in the fiber mounts are registered in relation to the tapered opening through body to direct the fibers at the angle with respect to the planar surface.

11. The method of claim 6 wherein the openings through the body are double tapered holes.

12. The method of claim 6 wherein the openings are formed by LFOA micromachining.

13. The method of claim 10 wherein the tapered openings are made by deep reactive ion etching.

14. In an optical cross connect device comprising:

a first array of optical fibers for providing a plurality of optical signals, an array of lenses positioned for receiving the optical signals from the first array and for directing the signals;

a MEMS mirror array positioned for receiving optical signals directed by the lens array and for reflecting the directed optical signals, and a second array of optical fibers for receiving the optical signals after reflection from the MEMS mirror array, THE IMPROVEMENT wherein the first array of optical fibers is an optical fiber array according to claim 1.

15. In an optical cross connect device comprising:

a first array of optical fibers for providing a plurality of optical signals, an array of lenses positioned for receiving the optical signals from the first array and for directing the signals;

a MEMS mirror array positioned for receiving optical signals directed by the lens array and for reflecting the directed optical signals, and a second array of optical fibers for receiving the optical signals after reflection from the MEMS mirror array, THE IMPROVEMENT wherein the first and second arrays of optical fibers are optical fiber arrays according to claim 1.

* * * * *